(12) United States Patent
Billman (10) Patent No.: US 8,639,620 B1
(45) Date of Patent: Jan. 28, 2014

(54) SYSTEMS AND METHODS FOR EVACUATION CARD

(75) Inventor: Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 544 days.

(21) Appl. No.: 12/408,843

(22) Filed: Mar. 23, 2009

(51) Int. Cl.
*G06Q 40/00* (2012.01)
*G06Q 50/00* (2012.01)
*G06Q 20/10* (2012.01)

(52) U.S. Cl.
CPC .............. *G06Q 20/105* (2013.01); *G06Q 20/10* (2013.01); *G06Q 40/10* (2013.01)
USPC .......................................... 705/41; 235/380

(58) Field of Classification Search
None
See application file for complete search history.

(56) References Cited

U.S. PATENT DOCUMENTS

| | | | |
|---|---|---|---|
| 6,012,035 | A | 1/2000 | Freeman, Jr. et al. |
| 7,319,986 | B2 * | 1/2008 | Praisner et al. ................. 705/39 |
| 7,698,151 | B2 * | 4/2010 | Gozzo et al. ................... 705/1.1 |
| 2002/0013728 | A1 * | 1/2002 | Wilkman ........................ 705/14 |
| 2002/0174030 | A1 * | 11/2002 | Praisner et al. ................ 705/26 |
| 2002/0198806 | A1 * | 12/2002 | Blagg et al. .................... 705/35 |
| 2004/0181453 | A1 * | 9/2004 | Ray et al. ........................ 705/16 |
| 2006/0106650 | A1 | 5/2006 | Bush |
| 2006/0113376 | A1 * | 6/2006 | Reed et al. ..................... 235/379 |
| 2007/0225994 | A1 * | 9/2007 | Moore .............................. 705/1 |
| 2007/0276681 | A1 | 11/2007 | Moore |
| 2008/0059373 | A1 | 3/2008 | Phillips et al. |
| 2008/0306867 | A1 * | 12/2008 | Lyons et al. .................... 705/40 |
| 2010/0306154 | A1 * | 12/2010 | Poray et al. ..................... 706/47 |
| 2011/0119181 | A1 * | 5/2011 | Puleo et al. ..................... 705/41 |
| 2012/0143754 | A1 * | 6/2012 | Patel .............................. 705/41 |

OTHER PUBLICATIONS

"Product Feature—Prepaid Cards: The prepaid revolution gathers pace," Anonymous; Cards International , p. 10-13 , Aug. 31, 2005. [Full text from Dialog/proquest].*
"The Air Rescue Card", Website for Travel Assist. http://web.archive.org/web/20061016080530/http://www.travelassistnetwork.com/ [downloaded Feb. 7, 2011].*
O'Donnell, Anthony: "Hartford to Issue Emergency Claim Card," Insurance & Technology, Jun. 21, 2008, 3 pages.*
"Welcome to the Unemployment Insurance Electronic Payment Card Program", Rhode Island Department of Labor and Training, 2 pages.
O'Donnell, Anthony: "Hartford to Issue Emergency Claim Card", Insurance & Technology, Jun. 21, 2006, 3 pages.

* cited by examiner

*Primary Examiner* — Kirsten Apple
*Assistant Examiner* — Joan Goodbody
(74) *Attorney, Agent, or Firm* — Brooks, Cameron & Huebsch, PLLC (57) ABSTRACT

A financial card, also referred to as an evacuation card, may be activated by an institution during an evacuation and may be used in accordance with usage parameters for the purchase of goods and services from merchants during an evacuation. After the evacuation ends, the financial card may be deactivated. The financial card may have a predetermined spending limit or no spending limit as determined by the institution. The spending limit may be modified during an evacuation, such as if the event underlying the evacuation becomes more severe or the duration of the evacuation increases, for example. In an implementation, the financial card may only be used for purchases within a particular geographic location as determined by the institution, may only be used to purchase certain items, and/or may only be used to make purchases at certain merchants.

21 Claims, 6 Drawing Sheets

SYSTEMS AND METHODS FOR EVACUATION CARD

BACKGROUND

Evacuation is the movement of people from a dangerous place due to the threat or occurrence of a catastrophic event or disaster. Examples are the evacuation from a city due to a hurricane or the evacuation of a region because of a flood.

The expense for a person to evacuate is high and is paid by the person who is evacuating. However, the person may lack the means to pay for lodging, food, and services during an evacuation. Therefore, many people wait as long as possible to evacuate (e.g., they wait until they are highly confident of impact of the disaster) or do not evacuate at all, putting them at increased risk for injury or death.

Additionally, if a user is going to file an insurance claim for reimbursement of expenses incurred during an evacuation, the user retains receipts or other proofs of purchase during the evacuation. The user then provides the receipts and proofs of purchase along with a claim. Such a process is burdensome to the user, especially during an evacuation.

SUMMARY

A financial card, also referred to as an evacuation card, may be activated by an institution during an evacuation and may be used in accordance with usage parameters for the purchase of goods and services from merchants during an evacuation. After the evacuation ends, the financial card may be deactivated.

In an implementation, the financial card may have a predetermined spending limit or no spending limit as determined by the institution. The spending limit may be modified during an evacuation, such as if the event underlying the evacuation becomes more severe or the duration of the evacuation increases, for example.

In an implementation, the financial card may only be used for purchases within a particular geographic location as determined by the institution, may only be used to purchase certain items, and/or may only be used to make purchases at certain merchants.

In an implementation, the financial card may cover expenses associated with evacuation due to catastrophic events or disasters. The financial card may be used to make purchases directed to nourishment including food and water, clothing, shelter, security (e.g., protection from chemical, biological, and/or radioactive threats, etc.), transportation, fuel, rescue services, etc. during an evacuation.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
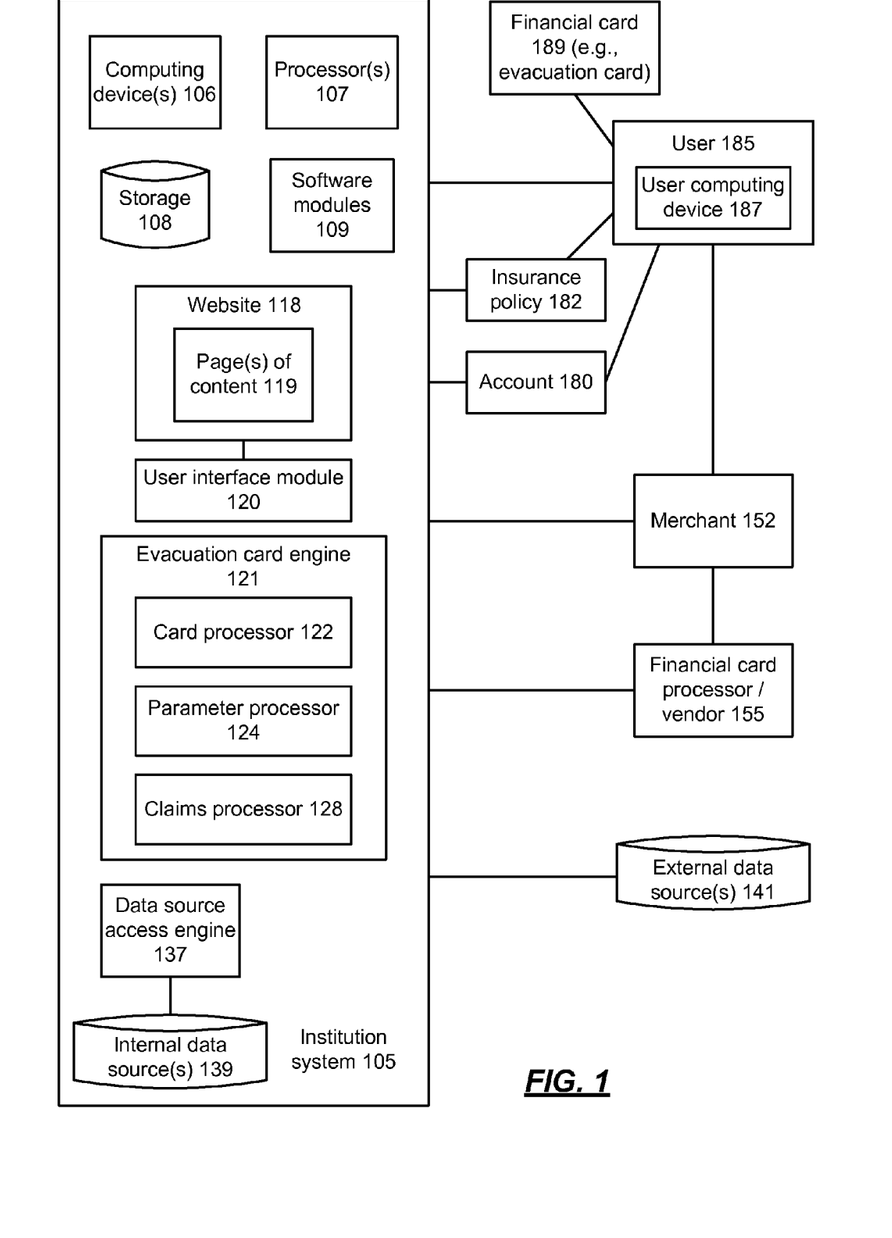
FIG. 1 is a block diagram of an implementation of a system that may be used in conjunction with an evacuation card.

FIG. 1 is a block diagram of an implementation of a system that may be used in conjunction with an evacuation card. An institution system 105 may be affiliated with an institution which may be any type of entity capable of providing financial and/or insurance services, such as issuing and maintaining insurance policies and processing claims, issuing financial cards, maintaining accounts involving financial cards, and/or processing transactions involving financial cards or associated accounts. For example, the institution may be any type of insurance company, financial services company, bank, etc.

A user 185 and an associated user computing device 187 are shown. In an implementation, a user 185 may be an individual who owns an account 180 that is held by the institution and accessible via the institution system 105. The account 180 may be any type of account for depositing funds and from which funds may be withdrawn, such as a savings account, a checking account, a brokerage account, and the like.

Alternatively or additionally, the user 185 may have an insurance policy 182 that has been issued by the institution. The insurance policy 182 may be for any type of insurance, such as homeowner's insurance, vehicle insurance, life insurance, etc. In an implementation, the user 185 may obtain evacuation insurance from the institution system 105 as a standalone insurance product, as a line item on an insurance policy (e.g., on a homeowner's insurance policy), or as a rider to an existing insurance policy, for example. Evacuation insurance may be directed to insurance that may cover expenses associated with the user's evacuation due to catastrophic events or disasters. In an implementation, the evacuation insurance may cover expenses directed to nourishment including food and water, clothing, shelter, security (e.g., protection from chemical, biological, and/or radioactive threats, etc.), transportation, fuel, rescue services, etc. that a user may incur during an evacuation. The evacuation insurance may be supplemental to state and/or federal coverage.

In an implementation, the user 185 may apply for evacuation insurance from the institution system 105, e.g., via an application provided on a website 118 of the institution system 105, via an application that the user 185 fills out and mails, faxes, or emails to the institution system 105, or via an application taken over the telephone by a representative of the institution system 105, for example. The institution system 105 may receive the application for evacuation insurance, and may process the application, perform underwriting in an implementation, and approve the user 185 for an evacuation insurance policy. The institution system 105 may generate and provide an evacuation insurance policy to the user 185 upon approval of the user for such coverage. In an implementation, upon receiving a payment from the user 185 for the premium for the evacuation insurance policy, the institution system 105 may generate and provide a financial card 189 to the user 185. The financial card 189 may be referred to as an evacuation card. Therefore, in an implementation, pursuant to the user 185 purchasing evacuation insurance, they may also receive a financial card 189. The financial card 189 may be issued to the user in conjunction with the insurance policy 182.

Catastrophic events or disasters may be natural events and/or non-natural events. Natural events that may cause an evacuation may include hurricanes, floods, earthquakes, cyclones, volcanic activity, wildfires, blizzards, an act of God, etc. Non-natural events that may cause an evacuation may include military attacks, industrial accidents, nuclear accidents, traffic accidents, including train or aviation accidents, fire, bombings, terrorist attacks, military battles, viral outbreak, an accident, a health-related epidemic, etc. Evacuation insurance may cover the costs of evacuations carried out before, during, or after the natural events or non-natural events. Thus, evacuation costs incurred by the user may be covered, even if no property of the user is damaged by the event.

An evacuation that may be covered by evacuation insurance or that may trigger activation of the financial card 189 may occur using predetermined conditions such as FEMA (Federal Emergency Management Agency) or an authorized official recommending or ordering an evacuation or an institution affiliated with the institution system 105 authorizing an evacuation (e.g., for certain cities or areas, using zip codes, proximity to the disaster, or other criteria).

In an implementation, the user 185 may be provided with the financial card 189 that may be used during an evacuation, as described further herein. The financial card 189 may be used by the user 185 to purchase goods and services, e.g., from a merchant 152, during an evacuation. In an implementation, the financial card 189 may be set such that the user 185 is prevented from getting a cash advance on the financial card 189 (e.g., the cash advance limit may be set to zero).

Although only one merchant 152 is shown, the financial card 189 may be used to purchase goods and services from any number of merchants. Depending on the implementation, the financial card 189 may be issued and/or transactions may be processed by the institution system 105 affiliated with the institution or by another entity such as a financial card processor or vendor 155.

Depending on the implementation, the financial card 189 may be used similar to, function similar to, and/or be processed similar to a debit card, a check card, a prepaid card, a credit card, a secured credit card, an ATM (automated teller machine) card, a bank card, or the like.

A debit card is a card which provides an alternative payment method to cash when making purchases. Its functionality is similar to writing a check as the funds are withdrawn directly from either a bank account (often referred to as a check card) or from the remaining balance on the card.

A prepaid credit card or prepaid card is not really a credit card, as no credit is offered by the card issuer: the user spends money which has been "stored" via a prior deposit by the user or someone else, such as the institution. However, it carries a credit card brand (e.g., Visa or MasterCard) and can be used in similar ways. After obtaining the card, the user may use the card to spend the money. Credit card companies as well as various other financial institutions may issue both types of cards to a user with different card numbers.

A credit card is a system of payment in which money is not removed from the user's account after every transaction. The issuer lends money to the user to be paid to the merchant. It is also does not require that the balance be paid in full each month. A credit card allows the user to revolve their balance at the cost of having interest charged. A secured credit card is a type of credit card secured by a deposit account owned by the user. Typically, the user deposits between 100% and 200% of the total amount of credit desired. Thus, if the user puts down $1000, they will be given credit in the range of $500-$1000. This deposit is held in a special savings account. The user of a secured credit card is still expected to make regular payments, as they would with a regular credit card, but should they default on a payment, the card issuer has the option of recovering the cost of the purchases paid to the merchants out of the deposit.

An ATM card (also known as a bank card, client card, key card, or cash card) is a card issued by a bank, credit union, or building society. It can be used at an ATM for deposits, withdrawals, account information, and other types of transactions, often through interbank networks. Some ATM cards can also be used at merchants for point-of-sale purchases.

In an implementation, the financial card 189 may be deactivated when issued to the user 185, but may be activated when an evacuation is ordered or suggested for the user 185. The user 185 may pay for their expenses (e.g., lodging, food, clothing, medical, etc.) with the financial card 189 during an evacuation and may not retain receipts, proofs of purchase, or other documentation as the institution system 105 may keep track of the purchases with a claims processor 128 described further herein.

The financial card 189 may have a predetermined spending limit or no spending limit as determined by the institution. The spending limit may be modified (e.g., increased) during an evacuation, such as if the event underlying the evacuation becomes more severe or the duration of the evacuation increases, for example. In an implementation, the financial card 189 may only be used for purchases within a particular geographic location as determined by the institution, may only be used to purchase certain items, and/or may only be used to make purchases at certain merchants (e.g., using the evacuation, the event, the user, etc.).

The financial card 189 may be bundled with evacuation insurance or other insurance or provided as a standalone product. In an implementation, an evacuation kit may be provided to the user 185 by an institution affiliated with the institution system 105 in conjunction with the financial card 189. The evacuation kit 189 may comprise survival supplies comprising items such as a medical kit, a water purifier, a radio, a navigational system, a battery or chargeable battery or power supply, food, a life vest, a raft, clothing, fire protection, etc. that will provide for a user's basic needs (and the basic needs of his family, dependents, or beneficiaries named on an insurance policy, for example) for a certain amount of time, such as 72 hours, one week, etc. In an implementation, the evacuation kit 189 may be customized to the user using information provided by the user and/or retrieved from storage by the institution system 105.

In an implementation, the financial card 189 may comprise information pertaining to the user 185, such as a user photograph or picture, an account number or identifier of a user account, a policy number or identifier of a user insurance policy, medical information of the user 185, and contact information of the user 185 and friends or family members of the user 185, for example. The information may be encoded or in the clear. In an implementation, the financial card 189 may also serve as an identification card of the user 185.

The institution system 105 may include a user interface module 120, an evacuation card engine 121, and a data source access engine 137. The user interface module 120 may generate and format one or more pages of content 119 as a unified graphical presentation that may be provided to the user computing device 187 as an output from the evacuation card engine 121. In an implementation, the page(s) of content 119 may be provided to the user computing device 187 via a secure website 118 associated with the institution system 105. On the website 118, the user 185 may be presented with information pertaining to the account 180, the insurance policy 182, and/or a financial card 189, as described further herein. An example computing device is described with respect to FIG. 6.

The user 185 may communicate with the institution system 105 by way of a communications network such as an intranet, the Internet, a local area network (LAN), a wide area network (WAN), a public switched telephone network (PSTN), a cellular network, a voice over Internet protocol (VoIP) network, and the like. The user 185 may also communicate with the institution system 105 by phone, email, instant messaging, test messaging, web chat, facsimile, mail, and the like.

The evacuation card engine 121 may activate and deactivate the financial card 189 using a card processor 122. In an implementation, the card processor 122 may obtain data from internal data source(s) 139 and/or external data source(s) 141 by the data source access engine 137 to determine the status of an event that may lead to an evacuation and the status of an evacuation. After retrieving or otherwise receiving the data from the various sources, the card processor 122 may use tools, applications, and aggregators, for example, to determine when to activate the financial card 189 (e.g., during an evacuation, just prior to an evacuation, etc.) and when to deactivate the financial card 189 (e.g., when there is no evacuation, before and after an evacuation, etc.).

In an implementation, the activation of the financial card 189 may be triggered by an evacuation of an area comprising or in the vicinity of the residence address of the user 185. If the user 185 is outside of their residence address and is under a local evacuation order or suggested evacuation (e.g., user lives in a region that is not being evacuated, but is visiting another part of the country that gets an evacuation order), the user may alert the institution to have the financial card 189 activated.

In an implementation, a family member of the user 185 may be authorized to use the financial card 189 during an evacuation (e.g., if the user 185 is out of the area being evacuated). Alternatively or additionally, multiple financial cards may be provided to the user 185, each financial card associated with a different family member or person specified by the user 185 (e.g., via different user identifiers tied to the same account of the financial card 189). In this manner, each authorized user may use the account pertaining to the financial card 189 during an evacuation. In an implementation, purchases made during an evacuation with the various financial cards tied to the same account may be itemized or provided by user identifier. In this manner, the institution system 105 and/or the user 185 may determine the purchases made by each user during an evacuation.

The evacuation card engine 121 may provide and enforce usage parameters for the financial card 189 using a parameter processor 124. Parameters may include geographic regions (e.g., geo-fenced areas) where the financial card 189 may be used during an evacuation, which goods and services may be purchased with the financial card 189, which merchants may accept the financial card 189 for purchases, and spending limits on the financial card 189, for example. The parameter processor 124 may obtain data from the internal data source(s) 139, the external data source(s) 141, and/or the user 185 (e.g., via the website 118) and use this data along with tools, applications, and aggregators, for example, to determine the parameters and/or modify the parameters during an evacuation, in an implementation. The usage parameters may in part be using the expected durations of evacuation in a particular area, for example. Such data may be obtained from internal data source(s) 139 and/or external data source(s) 141 by the data source access engine 137.

Modification of the parameters may include changing the geographic region (e.g., geo-fenced area) where the financial card 189 may be used, changing the spending limit on the financial card 189, changing merchants that may accept the financial card 189 for a purchase, and/or changing the goods and services that may be purchased with the financial card 189. In an implementation, the user 185 may check the balance (remaining limit) on the financial card 189 via the website 118 and/or may request that the spending limit be increased.

In an implementation, the existing credit card/debit card network may be used to authorize and process transactions made with the financial card 189. Usage parameters may be checked by the financial card processor or vendor 155 in an implementation. Alternatively, the institution system 105 may check the usage parameters against a prospective transaction.

In an implementation, the geographic region(s) (e.g., geo-fenced area(s)) where the financial card 189 may be used while it is activated may be using the disaster track or projected path of the event underlying the evacuation. Secondary geographic regions may be included or added (e.g., to catch overflow of users traveling from the evacuation area to the secondary geographic region(s)). In an implementation, the geographic region where the card may be used for authorized purchases may be expanded as needed, e.g., in realtime during the evacuation or the event underlying the evacuation.

The financial card 189 may have limits as to an amount of money that may be spent on particular categories of products and services. In an implementation, the institution system 105 may assign one or more authorized merchant identifiers such as merchant category codes (MCCs), standard industrial classifications (SICs), and or North American Industry Classification System (NAICS) codes to the financial card 189. NAICS is the standard used by Federal statistical agencies in classifying business establishments for the purpose of collecting, analyzing, and publishing statistical data related to the U.S. business economy. In this manner, a financial card may only be used for purchases at merchants having the MCCs, SICs, and/or NAICS assigned to the financial card 189. This allows the institution to limit purchases made, and thus money spent, to particular merchants. The institution may also limit the amount of money that may be spent on a particular MCC on a financial card. Purchases from other merchants not having an MCC associated with the financial card 189 may not be authorized.

The institution may provide instructions such as being notified about spending on the financial card 189, limiting spending to certain types of purchases or certain stores or merchants (e.g., using merchant identifiers such as MCCs, SICs, and/or NAICS), setting spending limits on the financial card 189 (e.g., maximum spending amounts per day, maximum number of transactions per day, etc.), etc. The institution may also suspend or resume financial card 189 activity, for example. In an implementation, the user may view or be advised of any spending limit, prepaid balance, credit balance, and/or remaining balance on the financial card 189.

Merchants may also have an associated code that is indicative of their location. In an implementation, only merchants having a location within an authorized geographic region (e.g., using the evacuation, the event, etc.) may be authorized to accept transactions involving the financial card 189. Other transactions may be denied.

The evacuation card engine 121 may process evacuation claims and transactions involving the financial card 189 using a claims processor 128. The claims processor 128 may determine which purchases involving the financial card 189 are for authorized goods and services and which purchases are for unauthorized goods and services. Such a determination may be made during or after the evacuation by analyzing the individual products that were purchased with the financial card 189 in an authorized transaction during the evacuation (e.g., a transaction that met the usage parameters). Such information may be available on the receipt or coded in the receipt or purchase data maintained by the merchant 152, the institution system 105, or the financial card processor or vendor 155.

For example, an authorized transaction may have occurred at a supermarket during an evacuation, but the institution may later determine that the authorized transaction contained a purchase of an unauthorized product such as alcohol or other products on an unauthorized product list. Such an unauthorized product list may be provided to the user before or during an evacuation, e.g., such as with a notification that the financial card 189 has been or will be activated or with distribution of the financial card 189 to the user 185.

Each purchase of unauthorized goods and services with the financial card 189 may be determined to be an invalid evacuation claim and the institution may seek reimbursement from the user 185 for these purchases. In an implementation, the institution may access the account 180 of the user 185 to obtain reimbursement for the unauthorized purchases.

The evacuation card engine 121 has access to data, files, and documents pertaining to the user 185 as well as any other data, files, and documents that are currently stored by the institution system 105 as well as external data, files, and documents that may be useful in tracking an event that may cause or has caused an evacuation, in determining usage parameters of the financial card 189, and in analyzing evacuation claims (e.g., purchases made with the financial card 189 during an evacuation). Data pertaining to the event, the evacuation, the user 185, the user's residence address, the user's insurance policies, and/or the user account(s) may be retrieved from internal data source(s) 139 and/or external data source(s) 141. The retrieved data may be stored centrally, perhaps in storage 108. Information may also be provided to the institution system 105 from the user 185.

Internal data source(s) 139 may contain data, metadata, email, files, and/or documents that the institution system 105 maintains pertaining to the user 185, such as personal data such as name, physical address, email address, etc., evacuation insurance policy data such as premiums and coverage amounts for disasters, as well as other account information. The institution system 105 may access this information when issuing, activating, and/or deactivating the financial card 189 or setting or adjusting the usage parameters, for example.

A user access system may be communicatively coupled to the evacuation card engine 121 and may be configured to send machine-readable instructions to the evacuation card engine 121. As mentioned above, the institution system 105 may provide a unified graphical presentation output. The unified graphical presentation may be transmitted to the user access system. In an implementation, the unified graphical presentation may be combined with other materials and transmitted to the user 185. In an implementation, the unified graphical presentation is received by the user access system and transmitted directly to the user 185 without the inclusion of any other materials.

The user access system may be implemented as a web server in an implementation. The user access system, through the use of any suitable interactive web technology, provides an interactive experience to the user 185 through which access to evacuation and financial card data and status and related data can be accomplished. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 105 may include any combination of systems and subsystems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like.

The institution system 105 may comprise one or more computing devices 106. The computing device(s) 106 may have one or more processors 107, storage 108 (e.g., storage devices, memory, etc.), and software modules 109. The computing device(s) 106, including its processor(s) 107, storage 108, and software modules 109, may be used in the performance of the techniques and operations described herein.

Examples of software modules 109 may include modules that may be used in conjunction with issuing the financial card 189 to the user 185, activating and deactivating the financial card 189 (e.g., pursuant to an evacuation), setting and modifying usage parameters, generating web page content for display, and receiving instructions from the user 185, for example. While specific functionality is described herein as occurring with respect to specific modules, the functionality may likewise be performed by more, fewer, or other modules. An example computing device and its components are described in more detail with respect to FIG. 6.

Figure 2:
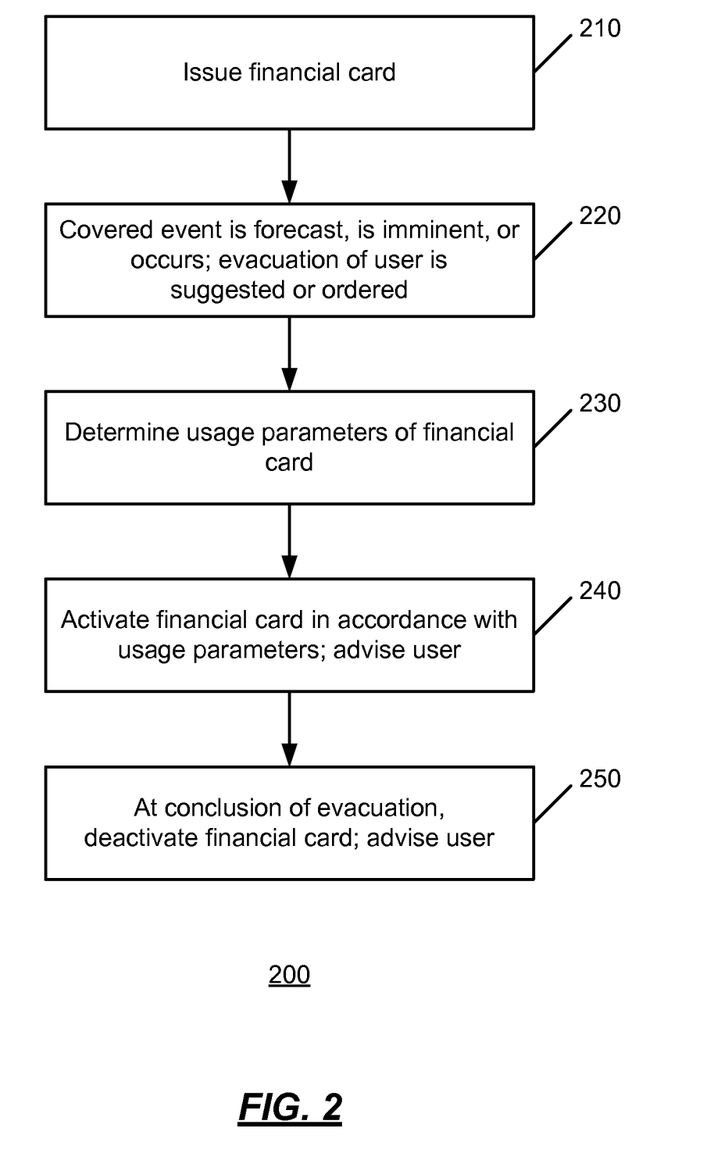
FIG. 2 is an operational flow of an implementation of a method that may be used to provide an evacuation card.

FIG. 2 is an operational flow of an implementation of a method 200 that may be used to provide an evacuation card. At 210, a financial card, such as an evacuation card (e.g., the financial card 189) may be issued to a user by an institution. The financial card may be used to pay expenses incurred by the user in the event of an evacuation due to a covered event (e.g., a natural event and/or a non-natural event, as specified in a related insurance policy or documentation provided with the financial card). A user may request a financial card from the institution system to cover certain expenses during an evacuation for one or more particular natural events and/or non-natural events. In an implementation, the financial card may be provided to the user pursuant to the institution providing a premium quote and receiving acceptance and/or payment from the user.

The institution may request and receive personal information from the user such as detailed information on family members or others whose expenses the financial card covers or others who may evacuate with the user. Such personal information may include the age and gender of each person, contact information of each person, medical conditions and health of each person, etc. In an implementation, the institution system may store information received from the user as well as any other data obtained pertaining to the user. The information may be stored in storage that is internal and/or external to the institution system.

At 220, a natural event or non-natural event whose evacuation is covered by the financial card may be forecast, may be imminent, or may occur. An evacuation may be suggested or ordered (e.g., by FEMA, by an authorized government official, by an institution affiliated with the institution system, using predetermined conditions such as a weather forecast or news broadcast, etc.). In an implementation, a website associated with the institution system may post information regarding the evacuation and may provide information as to which users will have their financial cards activated and when the activation may occur. Such a coverage determination (and thus a financial card activation) may be based on the user's residence address, zip code, or other criteria. In an implementation, the institution that provides the financial card to the user may provide an authorization to evacuate to the user. The authorization may be provided via a website, email, text message, facsimile, phone, and the like.

At 230, usage parameters for the financial card may be determined. The institution system may obtain data pertaining to the user, events, evacuations, etc. In an implementation, the institution system may access one or more internal and/or external data sources and may obtain data from the data source(s) pertaining to the user and/or the event causing the evacuation, such as the user's residence address, a length of duration of past evacuations that have occurred near the user's residence address, how many people and/or the particular people (e.g., family members, dependents, beneficiaries, etc.) that are to be covered by the financial card, an expected duration of the event, expenses to be covered by the financial card (e.g., food, clothing, shelter such as hotel, fuel such as gasoline), etc. Using the data, the institution system may determine the geographic region(s) in which the financial card may be activated during the evacuation, which merchants may be authorized to accept the financial card during the evacuation, which goods and services may be purchased with the financial card during the evacuation, and/or a spending limit to be placed on the financial card while it is activated.

At 240, the financial card is activated in accordance with the usage parameters and the user may be advised. In an implementation, the financial card may be activated without user approval or knowledge. Alternatively, the user may be advised of an evacuation and may provide instructions or confirmation if they would like the financial card activated. In an implementation, the user may pre-authorize the institution to activate the financial card in the event of an evacuation. The user may be advised of the activation via any electronic technique(s) such as phone, email, text message, etc. In an implementation, the user may be advised prior to the activation of the financial card or after the activation of the financial card. At 250, at the conclusion of the evacuation (i.e., when the evacuation ends), the financial card is deactivated and the user may be advised of the deactivation of the financial card.

Figure 3:
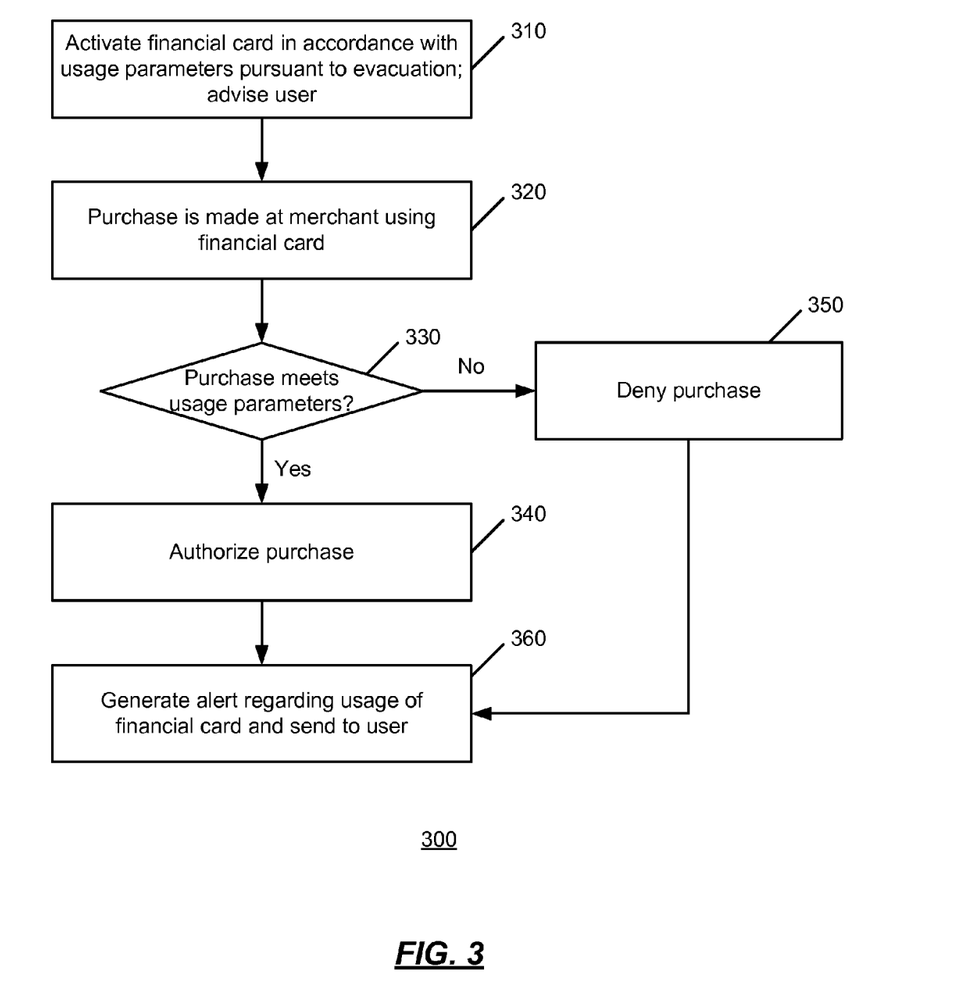
FIG. 3 is an operational flow of an implementation of a method that may be used in conjunction with a purchase made with an evacuation card.

FIG. 3 is an operational flow of an implementation of a method 300 that may be used in conjunction with a purchase made with an evacuation card. At 310, similar to 240 for example, a financial card (e.g., an evacuation card) may be activated in accordance with usage parameters and the user of the financial card may be advised.

At 320, a purchase may be made at a merchant using the activated financial card. The user may make a purchase at a physical location of the merchant or electronically, such as online via a website for example. In an implementation, a PIN (personal identification number) or other credentials may be used to authenticate a user of the financial card when making a purchase.

At 330, it may be determined whether the purchase meets the usage parameters that have been established for the financial card. In an implementation, the parameters may include one or more of the identifier (e.g., MCC, SIC, or NAICS) of the merchant, the product being purchased, the geographic location of the merchant, or the spending limit of the financial card.

If the usage parameters are met, the purchase may be authorized at 340. Otherwise, the purchase may be denied at 350. For example, in an implementation, the MCC of the purchase (e.g., of the merchant) may be compared to the categories associated with the financial card at 330. If the MCC is one of the authorized categories, the purchase may be authorized at 340. If it is determined that the MCC is not one of the authorized categories, the purchase may be denied at 350. In an implementation, if the MCC is one of the authorized categories, additional usage parameters may be checked, such as the spending limit and/or the location of the merchant.

At 360, an alert may be generated and sent to the user that the financial card has been presented to make a purchase. In this manner, the user may be advised of the usage of the financial card and thus may receive an indication if the financial card is being used without their knowledge. The institution system may alert the user on the website or by email, instant message, text message, telephone, facsimile, or other electronic means, for example.

Figure 4:
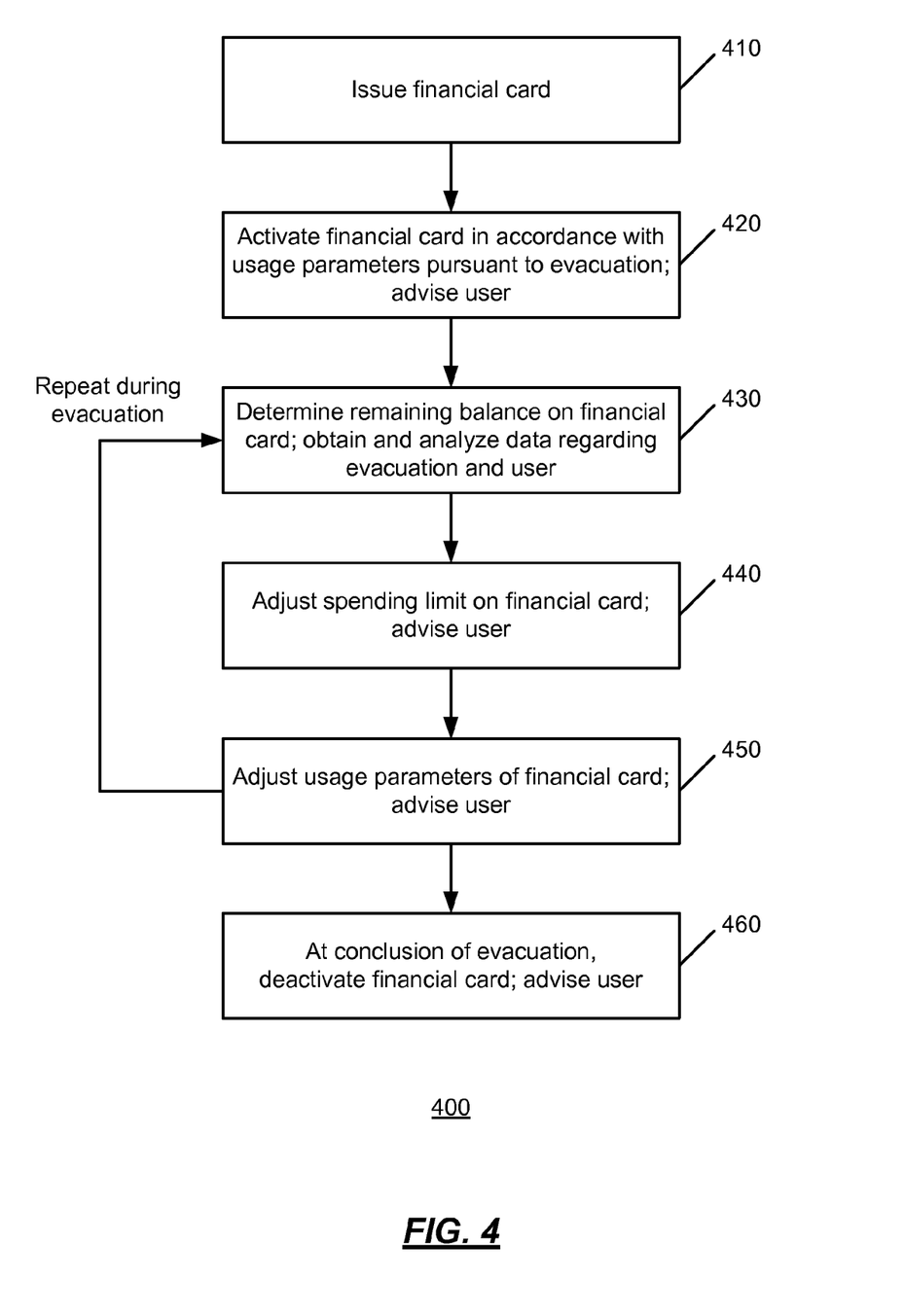
FIG. 4 is an operational flow of an implementation of a method that may be used in an adjustment of usage parameters of an evacuation card.

FIG. 4 is an operational flow of an implementation of a method 400 that may be used in an adjustment of usage parameters of an evacuation card. At 410, a financial card is issued to a user and at 420, pursuant to an evacuation, the financial card may be activated in accordance with usage parameters and the user may be advised of the financial card's activation. Operations 410 and 420 are similar to 210 and 240 described with respect to the method 200 and their further descriptions are omitted for brevity.

At 430, the remaining balance (e.g., the spending limit minus the amount already spent) may be determined. Data regarding the evacuation, the event causing the evacuation, the location of the event, and the user may be obtained from various data sources and analyzed. The analysis may be used to project a duration of the evacuation and to determine whether the usage parameters of the activated financial card are sufficient or should be modified. For example, the analysis may be used to determine whether the geographic region(s) where the financial card is valid should be expanded to include additional regions (e.g., if users are reporting that resources (shelter, food, etc.) are scarce in the valid geographic region(s)), whether the spending limit is sufficient, whether the remaining balance is sufficient for the projected duration of the evacuation, and whether MCCs, SICs, and/or NAICS should be added or removed from an authorized list of MCCs, SICs, and/or NAICS.

In an implementation, the user may request an increase to the spending limit or a change in one or more usage parameters to the institution. The institution system may receive the notice e.g., via a website, email, text message, facsimile, phone, mail, etc.

At 440, if the remaining balance is less than a predetermined amount and/or if it determined that the remaining balance and/or the spending limit of the financial card is not sufficient for the projected duration of the evacuation, the spending limit may be adjusted (e.g., raised). Alternatively or additionally, at 450, one or more other usage parameters of the financial card may be adjusted using the analysis of 430. The user may be advised regarding any adjustments to the spending limit or other usage parameters (e.g., via a website, email, text message, instant message, phone, facsimile, mail, etc.).

Operations 430 through 450 may be repeated periodically or from time to time during an evacuation. Periodically and/or at one or more predetermined times, the institution system may send a reminder and/or update to the user regarding the evacuation card. The reminder and/or update may be sent via a website, email, text message, facsimile, phone, mail, etc. The reminder and/or update may comprise information regarding the evacuation card such as its spending limit, its remaining balance, expected days or time until deactivation, and/or expected date of deactivation.

At some point, at 460, when the evacuation ends, the financial card may be deactivated and the user may be advised of the deactivation.

Figure 5:
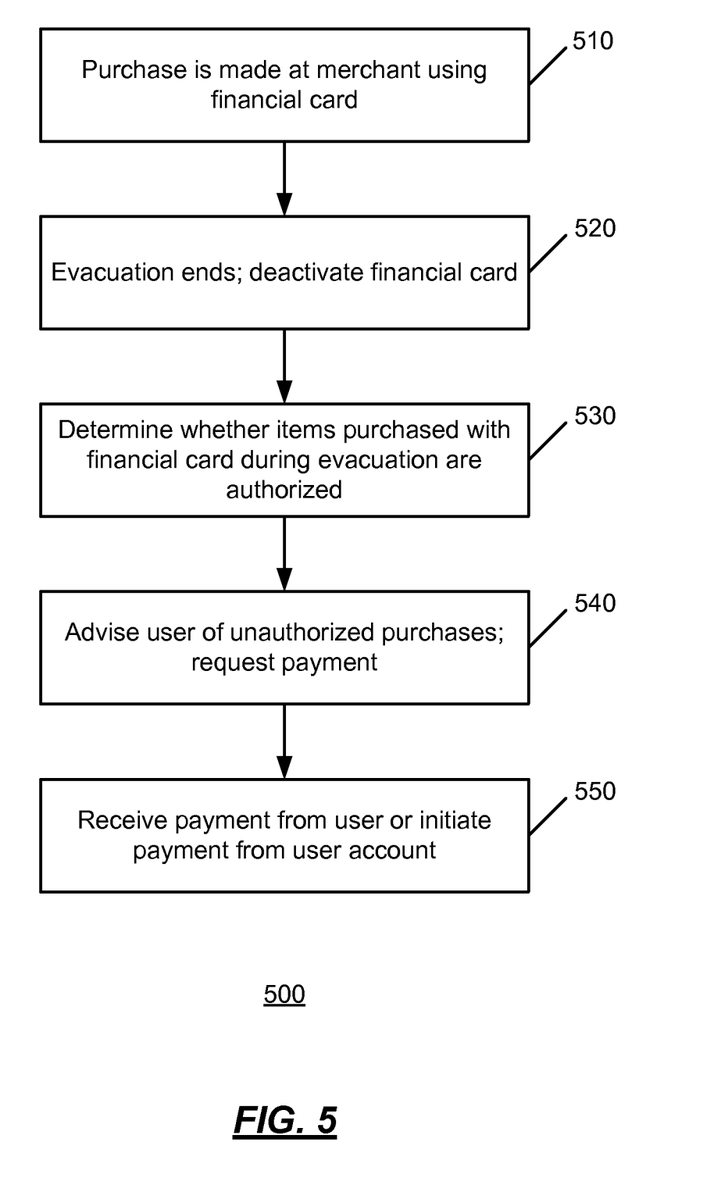
FIG. 5 is an operational flow of an implementation of a method that may be used in a determination of purchases made with an evacuation card.

FIG. 5 is an operational flow of an implementation of a method 500 that may be used in a determination of purchases made with an evacuation card. At 510, similar to 320, a purchase may be made at a merchant using an activated financial card. At 520, the evacuation ends and the financial card is deactivated.

At 530, it may be determined whether the items purchased with the financial card during the evacuation are authorized items. For example, some items that are sold by a merchant having an authorized MCC, SIC, or NAICS during an evacuation may in fact be unauthorized items (e.g., as set forth in information provided to the user with the financial card or with a notification sent before or during the evacuation such as when the financial card is activated). Such items may include alcohol, certain consumer electronics, gift cards, luxury items, etc.

The institution system may obtain and analyze receipts, proofs of purchase, and/or other documentation regarding the purchases made with the financial card. The receipts, proofs of purchase, and/or other documentation may be obtained from the merchant, the financial card processor, and/or the user for example.

At 540, an advisory may be generated and sent to the user regarding unauthorized items that were purchased with the financial card during the evacuation. The advisory may request payment from the user as reimbursement for the unauthorized items.

At 550, payment for the items that were not authorized may be received, e.g., from an account of the user maintained by the financial institution. In an implementation, the institution system may access an account of the user (such as the account 180 of FIG. 1) to obtain a reimbursement payment for the unauthorized items. In an implementation, when the user receives the financial card or when the financial card is activated, the user may provide authorization to the institution system to access such a funding source (or any funding source) for subsequent reimbursement of the user's purchase of unauthorized items with the financial card.

Although the examples described herein may be directed to financial cards issued by the institution affiliated with the institution system, the techniques may be used with respect to any financial cards, such as financial cards issued by a third party or entity that is separate from the institution system. In an implementation, the user may provide credentials to the institution system to access the accounts associated with the financial cards issued by a third party or other entity.

Figure 6:
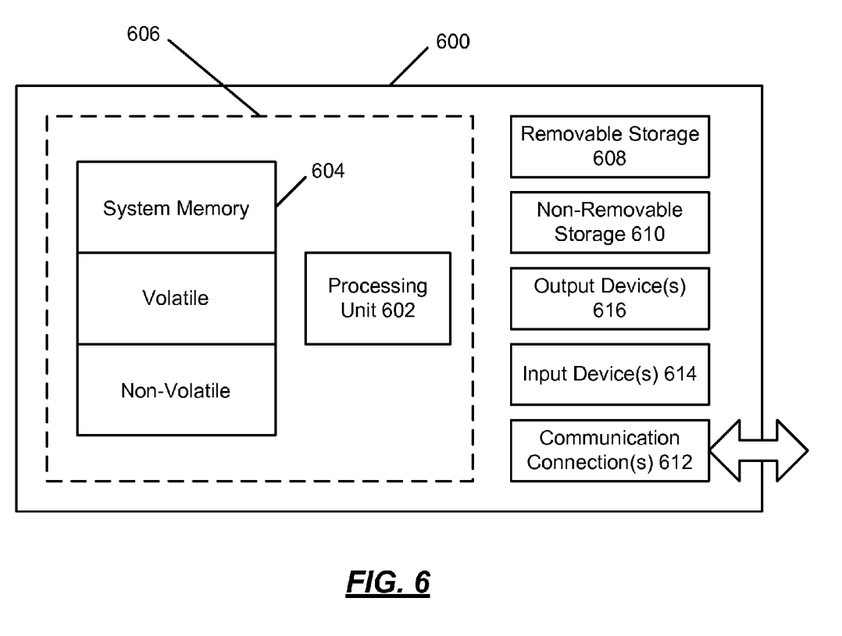
FIG. 6 is a block diagram of an example computing environment in which example embodiments and aspects may be implemented.

FIG. 6 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as RAM), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions for a financial card, said computer-readable instructions comprising instructions that:
   determine a plurality of usage parameters for a financial card using an evacuation and an event underlying the evacuation;
   activate the financial card for use in accordance with the usage parameters during the evacuation;
   publish information associated with:
      the evacuation;
      from among a number of users having financial cards, which user's financial cards will be activated;
      a list of unauthorized purchases during the evacuation; and
      when, for each of the number of users, the financial card will be activated;
   adjust a portion of the usage parameters without an input from the number of users in response to a change associated with the event underlying the evacuation while the evacuation is occurring;
   notify the number of users regarding the adjustment;
   determine an unauthorized purchase made by at least one of the number of users during the evacuation;
   process the unauthorized purchase; and
   access an account associated with the at least one of the number of users to obtain a reimbursement for the unauthorized purchase.

2. The non-transitory computer-readable medium of claim 1, further comprising instructions that deactivate the financial card at a conclusion of the evacuation.

3. The non-transitory computer-readable medium of claim 1, further comprising instructions that issue the financial card prior to the event underlying the evacuation.

4. The non-transitory computer-readable medium of claim 1, further comprising instructions that issue the financial card in conjunction with an insurance policy.

5. The non-transitory computer-readable medium of claim 1, wherein the usage parameters comprise a spending limit.

6. The non-transitory computer-readable medium of claim 1, wherein the usage parameters comprise a geographic region in which the financial card is authorized to be used for a purchase.

7. The non-transitory computer-readable medium of claim 1, wherein the usage parameters comprise a plurality of identifiers of merchants that are authorized to accept the financial card for a purchase.

8. A non-transitory computer-readable medium comprising computer-readable instructions for a financial card, said computer-readable instructions comprising instructions that:
   activate a financial card for use only during an evacuation using an event;
   publish information associated with:
      the evacuation;
      from among a number of users having financial cards, which user's financial cards will
      be activated;
      a list of unauthorized purchases during the evacuation; and
      when, for each of the number of users, the financial card will be activated;

adjust a usage parameter of the financial card during the evacuation without an input from the number of users in response to a change associated with the event while the evacuation is occurring;

notify the number of users regarding the adjustment;

determine an unauthorized purchase made by at least one of the number of users during the evacuation;

process the unauthorized purchase;

access an account associated with the at least one of the number of users to obtain a reimbursement for the unauthorized purchase; and deactivate the financial card at a conclusion of the evacuation.

9. The non-transitory computer-readable medium of claim 8, wherein the usage parameter comprises one of a spending limit of the financial card, a geographic region in which the financial card is authorized to be used for a purchase, or a plurality of identifiers of merchants that are authorized to accept the financial card.

10. The non-transitory computer-readable medium of claim 8, wherein adjusting the usage parameter of the financial card during the evacuation is using a duration of the evacuation and a location of the event.

11. The non-transitory computer-readable medium of claim 8, further comprising instructions that repeat the adjusting of the usage parameter a plurality of times during the evacuation.

12. The non-transitory computer-readable medium of claim 8, wherein the financial card is only activated for use to cover a plurality of expenses incurred during the evacuation by a user of the financial card.

13. The non-transitory computer-readable medium of claim 12, wherein the plurality of expenses is directed to at least one of food, clothing, shelter, security, transportation, fuel, or rescue services.

14. The non-transitory computer-readable medium of claim 8, wherein the event comprises a hurricane, a flood, an earthquake, a cyclone, volcanic activity, a wildfire, a blizzard, a military attack, an industrial accident, a nuclear accident, a traffic accident, a train accident, an aviation accident, a fire, a bombing, a terrorist attack, a military battle, a viral outbreak, an act of God, an accident, or a health-related epidemic.

15. A non-transitory computer-readable medium comprising computer-readable instructions for a financial card, said computer-readable instructions comprising instructions that:

set a plurality of usage parameters for a financial card, the usage parameters using an evacuation;

activate the financial card;

publish information associated with:
 the evacuation;
 from among a number of users having financial cards, which user's financial cards will be activated;
 a list of unauthorized purchases during the evacuation; and
 when, for each of the number of users, the financial card will be activated;

adjust the usage parameters without an input from the number of users in response to a change associated with the event underlying the evacuation while the evacuation is occurring;

notify the number of users regarding the adjustment;

determine an unauthorized purchase made by at least one of the number of users during the evacuation;

process the unauthorized purchase; and access an account associated with the at least one of the number of users to obtain a reimbursement for the unauthorized purchase.

16. The non-transitory computer-readable medium of claim 15, wherein the financial card is only activated for making the purchase during the evacuation.

17. The non-transitory computer-readable medium of claim 15, further comprising instructions that generate an alert regarding the purchase and send the alert to a user of the financial card after determining whether the purchase meets the adjusted usage parameters.

18. The non-transitory computer-readable medium of claim 15, wherein the usage parameters and the adjusted usage parameters comprise a geographic location of the merchant and an identifier of the merchant.

19. The non-transitory computer-readable medium of claim 18, wherein the identifier comprises a merchant category code (MCC), a standard industrial classification (SIC), or a North American Industry Classification System (NAICS) code.

20. The non-transitory computer-readable medium of claim 15, further comprising instructions that, if the purchase is authorized, determine after the evacuation ends whether an item of the purchase is an unauthorized item.

21. The non-transitory computer-readable medium of claim 20, further comprising instructions that initiate a payment for the item from an account of a user of the financial card, if the item is an unauthorized item.

* * * * *